UNITED STATES PATENT OFFICE.

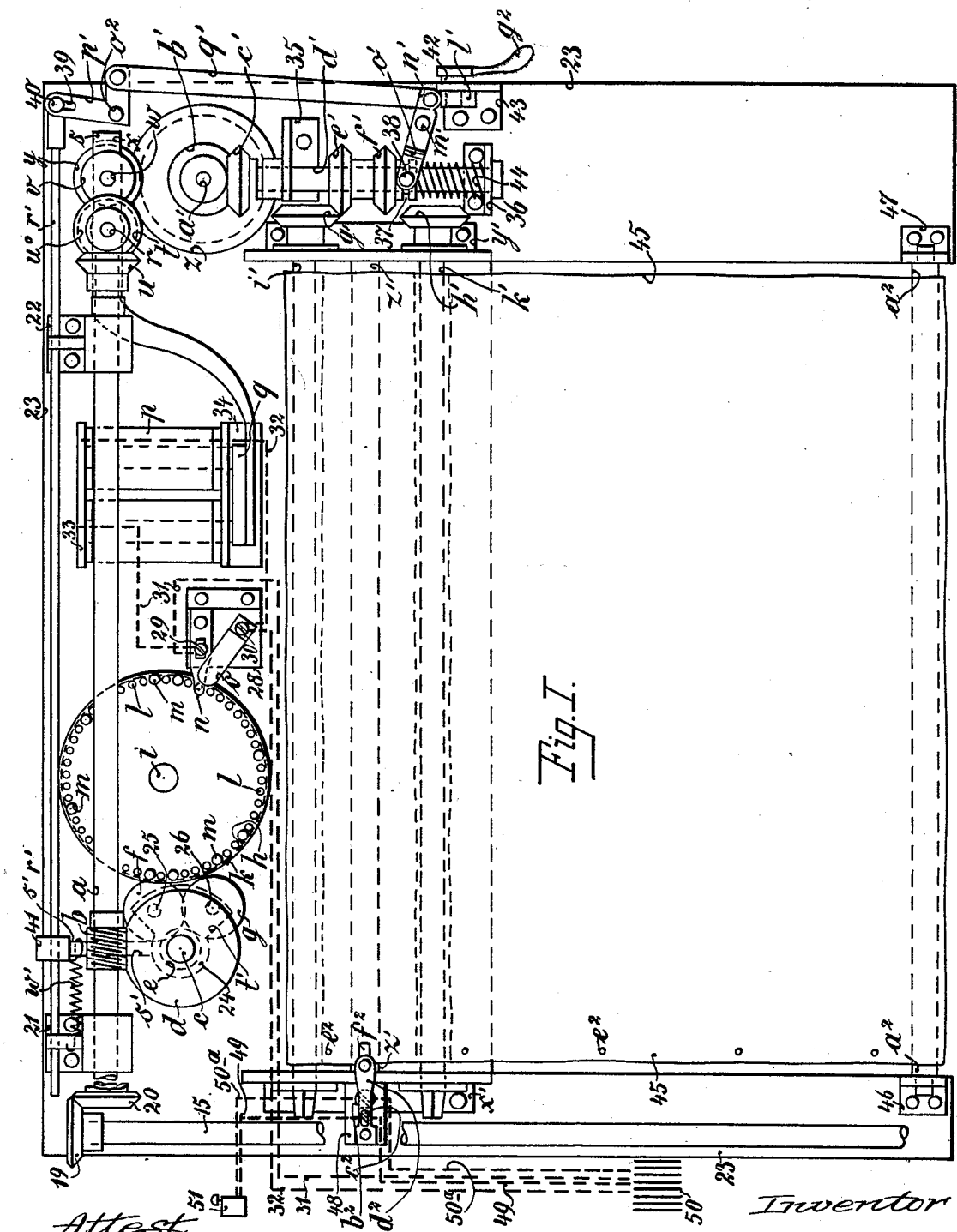

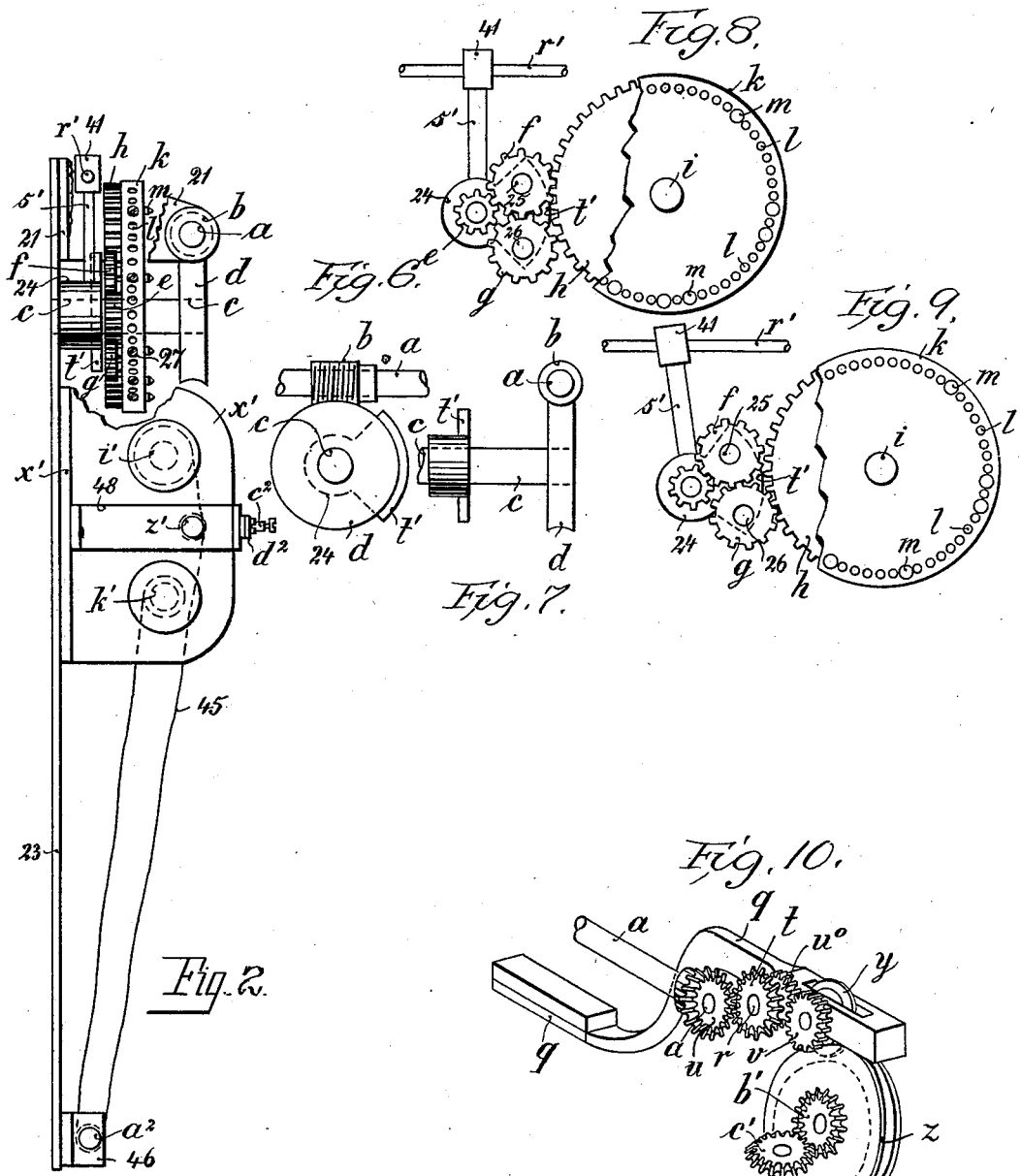
(No Model.)  3 Sheets—Sheet 2.
A. BERLINER.
ADVERTISING APPARATUS.
No. 521,009. Patented June 5, 1894.

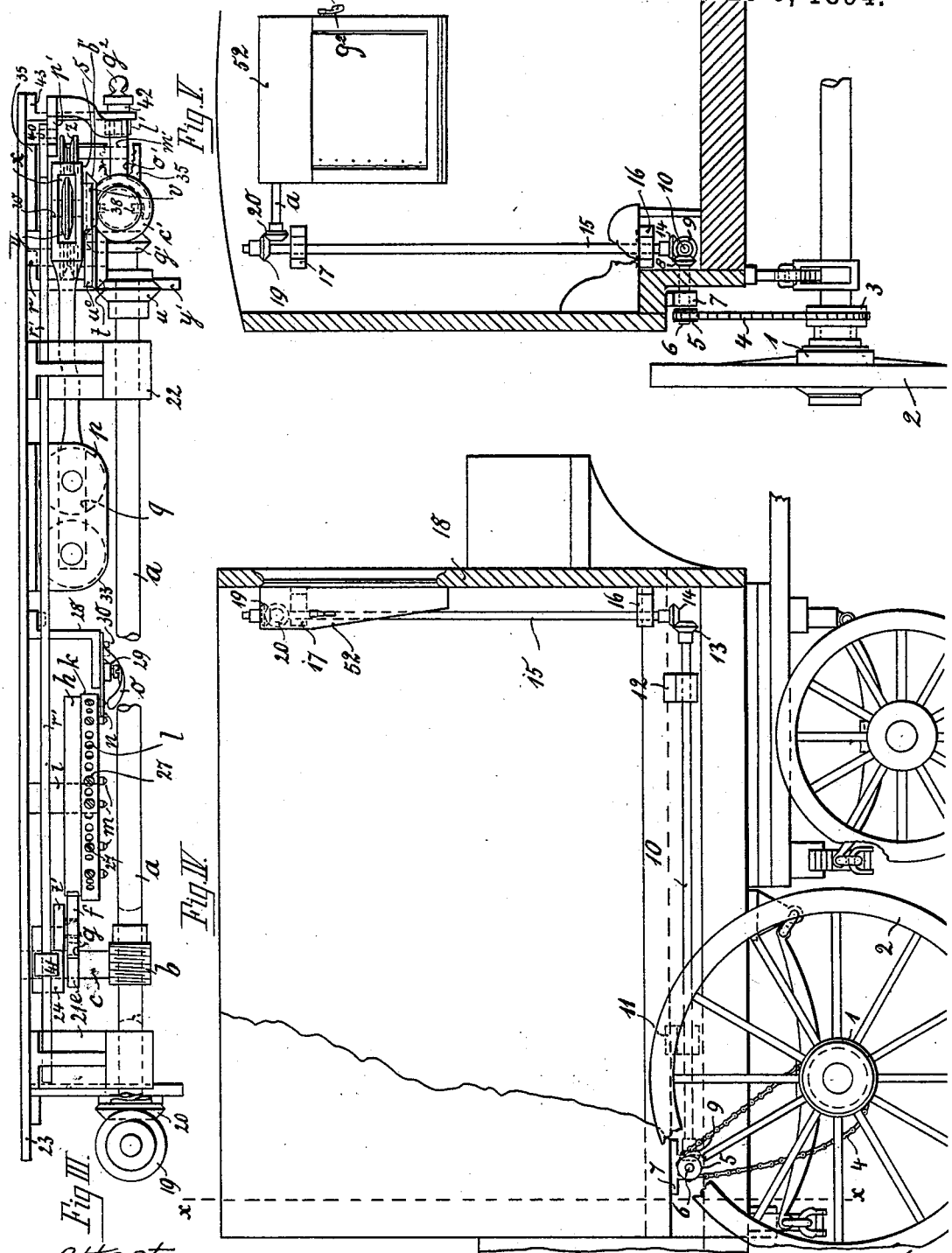

ADOLF BERLINER, OF BERLIN, GERMANY, ASSIGNOR TO KARL KÖHLER, OF SAME PLACE.

ADVERTISING APPARATUS.

SPECIFICATION forming part of Letters Patent No. 521,009, dated June 5, 1894.

Application filed September 2, 1893. Serial No. 484,668. (No model.)

*To all whom it may concern:*

Be it known that I, ADOLF BERLINER, a subject of the King of Prussia, and a resident of Berlin, in the Kingdom of Prussia and German Empire, have invented certain new and useful Improvements in Advertising Apparatus, of which the following is a full, clear, and exact description.

The advertising apparatus hereinafter described is designed to accomplish the continuous automatic display of business advertisements, &c., in the car as it approaches the place of business desiring advertisement.

Figure 1, of the accompanying drawings shows a front view of the advertising apparatus; Fig. 2, a side view, and Fig. 3, is a top view. Figs. 4 and 5 show a car furnished with the advertising apparatus, Fig. 4, being a side view; Fig. 5, a section on line $xx$ in Fig. 4. In Fig. 4, the side wall is considered as partly broken away. Fig. 6, is a detail view of the wheel $d$ in front elevation. Fig. 7 is a side view of the same. Fig. 8, is a front view of the disk partly broken away to show the wheel $h$ with the gears engaging therewith in one position. Fig. 9, is a similar view showing the gears in the other position. Fig. 10, is a perspective detail of the pivoted armature showing the connecting wheels.

The advertising apparatus is arranged as follows: The sprocket wheel 3 is firmly connected to the hub 1 of the wheel 2 of the car or other vehicle. By means of the sprocket chain 4, the wheel 3 is connected with the sprocket wheel 5, so that the motion of the sprocket wheel 3 is imparted to the sprocket wheel 5. This sprocket wheel 5, is firmly wedged upon or secured to an axle 6 which is journaled in the box 7, and in the side wall of the car. The axle 6 penetrates the side wall of the car and extends into the same far enough to allow a bevel gear wheel 8 to be firmly connected to it. The bevel gear wheel 9 which is placed firmly on the shaft 10, engages with the bevel gear wheel 8. The shaft 10, is journaled in the boxes 11 and 12 of the side wall of the car, and carries on its other end the bevel gear wheel 13. The bevel gear wheel 14 which is secured to the shaft 15 engages with the wheel 13. The shaft 15 is journaled in the boxes 16 and 17 of the front wall of the car. On the other end of the shaft is firmly secured the bevel gear 19 which engages with the bevel gear wheel 20. The bevel gear wheel 20 is secured firmly on the shaft $a$ of the advertising apparatus, which shaft $a$ is journaled in the boxes 21 and 22 of the wall 23, and carries the spiral $b$. This spiral stands in connection with the spiral wheel $d$, which is firmly secured on the axle $c$. The axle $c$ is journaled in the wall 23 and is firmly connected with a toothed wheel $e$. Behind the toothed wheel $e$ and arranged so as to turn on the axle $c$ is located the collar 24 of a plate $t'$ which is furnished with the axle pegs 25 and 26, on which the toothed wheels $f, g$ are journaled which toothed wheels are constantly in engagement with the wheel $e$ and are alternately in connection with the toothed wheel $h$, which is journaled on the axle $i$, of the wall 23 with the toothed wheel $h$ a disk $k$ is firmly fastened, which near the periphery of the same is supplied with bored holes $l$. In certain of the bored holes $l$ movable pegs $m$ are placed which are held firmly in place by screws 27 set radially into the periphery of the disk. Between the pegs $m$ of the disk $k$ a contact spring $n$ extends which is fastened on the box 28 of the wall 23. On the box 28 a second contact spring $o$ is fastened, whose free end lies over the free end of the contact $n$ at a certain distance from it. On the contact spring $n$ is fastened a contact point 29 while on the contact spring $o$ is a contact point 30 and to these contact points 29 and 30 are joined the wires 31 and 32 which starting out from the battery 50 are led to the electro-magnet $p$. The electro magnet $p$ is fastened to the wall 23 by means of the boxes 33 and 34. The armature $q$ of the electromagnet swings on a rotating peg $r$ of the wall 23 and forms lengthened out over the peg $r$, the arm $s$. On the peg $r$ the bevel wheel $t$ is firmly placed with which the wheel $u$ secured on the shaft $a$, engages. Fastened to the bevel wheel $t$ is the front wheel $u^0$ which engages with the front wheel $v$. The latter is firmly connected to the axle $w$ which is placed so as to turn in the arm $s$ of the armature 9. The arm $s$ has a slit $x$ in which the friction wheel $y$ which rests firmly on the axle $w$ is placed. The friction wheel $y$ engages at a definite time with the friction wheel $z$ which rests firmly on the rotary axle $a'$ of the wall 23. With the friction wheel $z$ is firmly connected a bevel wheel $b'$ which engages with the bevel wheel $c'$. The bevel wheel $c'$ rests firmly on a shaft $d'$ which is journaled in boxes 35 and 36 of the wall 23. On the axle $d'$ the mutually connected bevel wheels $e'$, $f'$ are fastened so as to shift, so that either the bevel wheel $e'$ may engage with the bevel wheel $g'$ or the bevel wheel $f'$ with the bevel wheel $h'$. The bevel wheel $f'$ is supplied on its collar or hub with a groove 37, into which a peg is inserted which springs from both links of the fork $o'$. The fork $o'$ pivots on the peg $m'$ of the wall 23, and its free arm $n'$ is fastened by a joint with the rod 9', which is fastened so as to turn on the angular lever $p'$. This angular lever $p'$ pivots on the peg $o^2$ of the wall 23 and is supplied with a slit 39, by means of which it moves on the peg 40 by which the lever $p'$ is fastened to the leading rod $r'$. The rod $r'$ is placed so as to be movable longitudinally in the boxes 21 and 22 of the wall 23 and is firmly fastened to the continuation 41 of the rod $s'$ which is screwed into the collar 24 of the disk $t'$. The rod $s'$ is fastened to the box 21 by means of a spiral spring $w'$.

The arm $n'$ of the fork $o'$ rests on an eccentric $l'$ of an axle 42, which is placed in the box 43 of the wall 23. To the axle 42 is connected a cranked handle $g^2$. Under the collar of the bevel wheel $f'$ is arranged a spiral spring, which presses against said wheel. The bevel wheels $g'$ $h'$ rest firmly on the shafts $i'$, $k'$ which are journaled in the boxes $x'$ $y'$ of the wall 23. About the shaft $k'$ are rolled various advertisements, placards or the like united into a band 45. The free end of the band 45 is carried over the roller $a^2$ which is journaled in the boxes 46, 47 of the wall 23 and over the roller $z'$ which is journaled in the boxes $x'$ $y'$ to the shaft $i'$ and is there fastened. On the box 48 of the wall 23 is found a contact point $b^2$. Over this is arranged, on the same box a contact spring $d^2$ provided with a contact point $c^2$ whose free end $f^2$ reaches over the placard band edge and presses on the contacted point $b^2$ serving the purpose of closing the electric current. Over the contact points $b^2$ and $c^2$ are carried the wires 49 and 50 which connect as a conductor the battery 50 with an electric signal contrivance 51. On the placard band edge are buttons $e^2$ at certain distances according to the length of the various placards.

The advertising apparatus is inclosed by a case 52 with a cut out front wall.

The apparatus works as follows: If on the route taken by the car, for example, eight store owners wish to have their placards exhibited by the car, the disk $k$ is first provided with the same number, that is with eight pegs $m$ and distances left between the pegs proportional to the distances of the eight stores from one another. Then the band formed from the various placards is provided with eight buttons $e^2$ which are fastened on the edge of the band between every two placards. Then the band is so placed that the first of the buttons $e^2$ finds its place under the free end $f^2$ of the contact spring $d^2$ which is raised by the button $3^2$ and removed from the polar peg $b^2$; the current which works the signal contrivance is then broken. Now when the car begins its journey, the revolution of its wheel 2 by means of bevel gear wheel 3, chain 4, bevel gear 5, bevel wheels 8 and 9, shaft 10, bevel wheels 13 14, shaft 15, bevel wheels 19, 20 communicated to shaft $a$, which latter partly conducts the motion in a highly retarded degree by means of the spiral $b$, spiral wheel $d$, cog wheel $e$, cog wheel $f$ to cog wheel $h$ and disk $k$, partly however in undiminished rapidity imparts it by means of bevel wheels $n$, $t$, cog wheels $u^0$ $v$ to the friction wheel $y$. Now if the car approaches the first store, whose placard should be visible in the car then meanwhile the disk $k$ has turned itself, so that the first of the pegs $m$ of the same touches the contact spring $n$ and raises the latter, while this peg $m$ glides under the contact spring $n$, in the further revolution of the disk $k$. The contact spring $n$ is raised until it touches the contact spring $o$. The wires 31, 32 are thereby made to connect as conductors and an electric circuit formed, which excites the electro magnet $p$. The armature $q$ of the last mentioned is pulled and the swinging of the same which then takes place about the peg $r$, brings the friction wheel $y$ into contact with the friction wheel $z$ in consequence of which the latter is rotated and sets in motion by means of bevel wheels $b'$, $c'$ the shaft $d'$ which by means of bevel wheels $e'$, $g'$ moves the placard barrel $i'$ in such a manner that the placard band 45 unrolls itself on the same. As this unrolling begins the button $e^2$ of the placard band glides away from the isolated end $f^2$ of the contact spring $d^2$, the latter falls down on the polar peg $b^2$, the wires 49 and 50° are connected as conductors and excite the electro magnet of the signal apparatus 51 whose call warns the passengers of the change taking place in the placard. Meanwhile the peg $m$ of the disk $k$ has removed itself from the contact spring $n$ so that this can return to its position of rest and in doing so it breaks the current which excited the electro magnet $p$, the armature 9 falls from the latter and the friction wheel $y$ moves out of contact with the friction wheel $z$ in consequence. The latter remains accordingly at rest and stops in this way the motion of the placard barrel $i'$ on which during its revolution the first placard of the placard band wound on the barrel $k'$ has unrolled itself. During this unrolling a second button $e^2$ of the placard band 45 has glided under the isolated end $f^2$ of the spring $d^2$ and the same breaks immediately the current which influences the signal apparatus 51 and silences the latter. When the car approaches the second store desiring advertisement, the disk $k$ has gradually turned itself until the second of the pegs $m$ of the same comes under the contact spring $n$, thus again closing the circuit and repeating the operation just described. When the car reaches its last station, the placards are all unrolled from the barrel $k'$ onto the barrel $i'$. At the beginning of the journey back, now, the placards are to appear in the car in reversed order corresponding to the reversed sequence of the places of business. This is accomplished by a shifting of the parts by the cranked handles $g^2$ and the eccentric $l'$. By means of this handle the eccentric is caused to operate the bevel gear wheels $e'\ f'$ to cause the bevel gear $e'$ to become disengaged from the bevel gear $g'$ and at the same time caused the bevel gear $f'$ to engage the bevel gear $h'$, and also through the rod $9'$ and bell crank lever drawing on the rod $r'$ and arm $s$ moves the cog wheel $h$ out of gear and thus reversing the direction of movement of the connected parts.

I claim as my invention—

1. In combination with a vehicle, a band as 45 carrying a series of advertisements, a train of continuously operating mechanism driven by the vehicle axle and normally out of engagement with the band, electrically controlled mechanism for causing the operating mechanism to operate the band, and a revolving circuit closer adapted to close the circuit at varying intervals of time, substantially as described.

2. In combination with a vehicle, a band as 45 carrying a series of advertisements, a train of continuously operating mechanism driven by the vehicle axle and normally unconnected with said band, electrically controlled mechanism for connecting said operating mechanism with the belt, and a revolving circuit closer having a series of adjustable contact points whereby the circuit may be automatically closed at predetermined varying intervals of time as desired.

3. In an advertising apparatus for vehicles a pair of rollers, a band carrying a series of advertisements mounted thereon, a normally stationary wheel with operative connections to said rollers, a pivoted lever having an armature at one end and a continuously driven wheel at the other, an electro magnet located in proximity to the armature of the lever and mechanism operated by the car wheel for closing the circuit through said magnet and causing said continuously driven wheel to engage the stationary wheel to shift the band, substantially as described.

4. In an advertising apparatus for vehicles a band carrying a series of advertisements mounted upon suitable rollers, a normally stationary wheel with operative connections to the rollers of the band, a pivoted lever carrying an armature at one end and a continuously driven wheel at the other, an electro magnet located in proximity to the armature, a train of mechanism operated continuously by the vehicle wheel, and a revolving disk operated by said mechanism and carrying a series of binding posts corresponding to the series of advertisements and spring contact points in circuit with the magnet in the path of said posts adapted to come in contact with said posts as the disk revolves whereby the circuit is intermittently closed through the magnet and the revolving wheel caused to contact with the stationary wheel to shift the belt, substantially as described.

5. In an advertising apparatus for vehicles a band carrying a series of advertisements mounted on suitable rollers a normally stationary wheel with operative connections to the rollers of the band, a pivoted lever carrying an armature at one end and a continuously driven wheel at the other, an electro magnet in proximity to said armature, a train of mechanism operated by the wheel of the vehicle, a revolving disk continuously driven by said mechanism, a pair of spring contact arms located in proximity to the disk in circuit with the magnet and means carried by the disk for causing said spring arms to contact for a limited time to shift the belt, substantially as described.

6. In combination with the advertising belt adapted to receive a series of advertisements of varying length, electrically controlled means for shifting said belt step by step to bring fresh advertisements in view, and a continuously revolving disk carrying a series of pins arranged varying distances apart to correspond with series of advertisements and adapted to operate said electrically controlled mechanism, substantially as described.

7. In combination with the advertising belt adapted to receive a series of advertisements of varying length, electrically controlled mechanism for shifting said belt and a revolving disk provided with a series of adjustable contact points circumferentially placed upon said disk for operating said electrically controlled mechanism, substantially as described.

In testimony that I claim the foregoing as my invention I have signed my name in presence of two subscribing witnesses.

ADOLF BERLINER.

Witnesses:
CARL NEUMANN,
GEORG NEUMANN.